United States Patent
Mepham et al.

(10) Patent No.: US 11,192,448 B2
(45) Date of Patent: Dec. 7, 2021

(54) AXLE ASSEMBLY FOR FRAME RAIL VEHICLES

(71) Applicant: ALLISON TRANSMISSION, INC., Indianapolis, IN (US)

(72) Inventors: Shaun Mepham, Clarkston, MI (US); Christopher G. Baillie, Lake Orion, MI (US); Vikram Chopra, Troy, MI (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 16/639,468

(22) PCT Filed: Aug. 16, 2018

(86) PCT No.: PCT/IB2018/056182
§ 371 (c)(1),
(2) Date: Feb. 14, 2020

(87) PCT Pub. No.: WO2019/035042
PCT Pub. Date: Feb. 21, 2019

(65) Prior Publication Data
US 2021/0129664 A1  May 6, 2021

Related U.S. Application Data

(60) Provisional application No. 62/546,459, filed on Aug. 16, 2017.

(51) Int. Cl.
*B60K 17/04* (2006.01)
*B60K 1/02* (2006.01)
*B60K 7/00* (2006.01)

(52) U.S. Cl.
CPC .............. *B60K 17/046* (2013.01); *B60K 1/02* (2013.01); *B60K 7/0007* (2013.01);
(Continued)

(58) Field of Classification Search
CPC ...... B60K 17/046; B60K 1/02; B60K 7/0007; B60K 2007/0038; B60K 2007/0061; B60L 2240/421
See application file for complete search history.

(56) References Cited

U.S. PATENT DOCUMENTS 4,570,741 A    2/1986  McCoy
5,762,154 A *  6/1998  Hsu ..................... A61G 5/047
                                                        180/15

(Continued)

FOREIGN PATENT DOCUMENTS

CN    104908579    9/2015
KR    101338796    12/2013
WO    213119047    8/2013

OTHER PUBLICATIONS

PCT Search Report and Written Opinion prepared for PCT/IB2018/056182, completed Oct. 17, 2018.

*Primary Examiner* — Erez Gurari
(74) *Attorney, Agent, or Firm* — Barnes & Thornburg LLP

(57) ABSTRACT

An axle assembly for frame rail vehicles is described herein. The axle assembly includes a drive unit that includes a first drive unit assembly, a second drive unit assembly, a first axle shaft, and a second axle shaft. The first drive unit assembly includes a first electric machine, a first output assembly, and a first offset gear reduction assembly. The second drive unit assembly includes a second electric machine, a second output assembly, and a second offset gear reduction assembly. The first electric machine and the second electric machine are orientated in a same direction, and spaced such that the axle centerline axis is positioned between the first electric machine and the second electric machine. The first offset gear reduction assembly is spaced from the second offset gear reduction assembly such that the axle centerline (Continued)

axis is positioned between the first offset gear reduction and the second offset gear reduction.

34 Claims, 16 Drawing Sheets

(52) U.S. Cl.
CPC ............... *B60K 2007/0038* (2013.01); *B60K 2007/0061* (2013.01); *B60L 2240/421* (2013.01); *B60Y 2200/142* (2013.01)

(56) References Cited

U.S. PATENT DOCUMENTS

| | | | |
|---|---|---|---|
| 5,921,338 A * | 7/1999 | Edmondson | B60K 23/08 |
| | | | 180/65.51 |
| 6,089,341 A | 7/2000 | Roy | |
| 6,540,632 B1 | 4/2003 | Wendl et al. | |
| 6,664,694 B2 | 12/2003 | Yang | |
| 6,698,313 B2 * | 3/2004 | Gaffney | A61G 5/1032 |
| | | | 74/665 N |
| 6,727,620 B2 | 4/2004 | White et al. | |
| 6,752,227 B1 | 6/2004 | Bachmann | |
| 7,134,517 B1 | 11/2006 | Kaiser et al. | |
| 7,195,085 B2 | 3/2007 | Pia | |
| 7,377,343 B2 * | 5/2008 | Adams, III | B60K 7/0007 |
| | | | 180/65.6 |
| 7,703,565 B2 | 4/2010 | Ikenoya et al. | |
| 7,712,561 B2 | 5/2010 | Niwa | |
| 9,079,482 B2 | 7/2015 | Besler et al. | |
| 9,090,142 B2 | 7/2015 | Lee | |
| 9,132,723 B2 | 9/2015 | Munster et al. | |
| 9,975,576 B2 | 5/2018 | Flaxman | |
| 10,800,242 B2 * | 10/2020 | Langhoff | B60K 17/043 |
| 2003/0010549 A1 * | 1/2003 | Hinton | B60K 17/046 |
| | | | 180/65.51 |
| 2003/0111280 A1 * | 6/2003 | Platner | B60K 1/02 |
| | | | 180/65.6 |
| 2003/0132039 A1 | 7/2003 | Gaffney et al. | |
| 2004/0124019 A1 | 7/2004 | Harrup et al. | |
| 2006/0054368 A1 | 3/2006 | Varela | |
| 2006/0180366 A1 | 8/2006 | Brill et al. | |
| 2008/0018064 A1 | 1/2008 | Martin et al. | |
| 2008/0230284 A1 * | 9/2008 | Schoon | E02F 9/207 |
| | | | 180/6.5 |
| 2008/0230289 A1 * | 9/2008 | Schoon | B60K 17/356 |
| | | | 180/65.6 |
| 2009/0032321 A1 | 2/2009 | Marsh et al. | |
| 2010/0187044 A1 * | 7/2010 | Nabeshima | B60B 11/06 |
| | | | 184/26 |
| 2010/0191417 A1 * | 7/2010 | Murahashi | B60B 11/06 |
| | | | 701/36 |
| 2011/0094807 A1 | 4/2011 | Pruitt et al. | |
| 2012/0142487 A1 | 6/2012 | Winter et al. | |
| 2014/0011620 A1 | 1/2014 | Munster et al. | |
| 2014/0051538 A1 | 2/2014 | Wenthen et al. | |
| 2014/0288739 A1 | 9/2014 | Braun et al. | |
| 2015/0226300 A1 * | 8/2015 | Neumann | B60K 17/165 |
| | | | 74/650 |
| 2017/0122408 A1 * | 5/2017 | Chung | F16H 57/10 |
| 2020/0384806 A1 * | 12/2020 | Falls | B60K 17/046 |
| 2021/0001939 A1 * | 1/2021 | Beiler | B60K 17/10 |
| 2021/0008969 A1 * | 1/2021 | Chopra | B60K 7/0007 |

* cited by examiner

AXLE ASSEMBLY FOR FRAME RAIL VEHICLES

CROSS-REFERENCE TO RELATED APPLICATION

This application is the U.S. national phase of PCT/IB2018/056182, filed on Aug. 16, 2018, which claims priority to U.S. Provisional Application No. 62/546,459, filed Aug. 16, 2017, the disclosures of which are hereby incorporated by reference in their entirety for all purposes.

FIELD OF THE DISCLOSURE

The present invention relates to vehicle axle assemblies, and more particularly, to an axle assembly for use with frame rail vehicles.

BACKGROUND

At least some known frame rail trucks include double axle systems for increasing the load transport capability of the frame rail trucks. Increasingly, manufacturers have turned to electric and hybrid propulsion systems for increased performance and efficiency.

Accordingly, there is a need to provide an axle assembly that allows packaging into the tight space between the chassis rails while maintaining the independent wheel drive and multi-speed gear reduction capability.

The present invention is aimed at one or more of the problems identified above.

SUMMARY OF THE INVENTION

Accordingly, the present invention provides a drive unit and an axle assembly for a vehicle with increased performance and efficiency.

In one embodiment of the present invention, a drive unit for use with an axle assembly is provided. The drive unit includes drive unit housing, a first drive unit and a second drive unit positioned within the drive unit housing, a first axle shaft, and a second axle shaft. The first axle shaft is orientated along an axle centerline axis and extends outwardly from the drive unit housing in a first direction that is defined along the axle centerline axis. The second axle shaft is orientated coaxially with the first axle shaft along the axle centerline axis and extends outwardly from the drive unit housing in a second direction opposite the first direction. The first drive unit includes a first electric machine and a first gear assembly for transferring torque from the first electric machine to the first axle shaft. The first gear assembly includes a first output assembly coupled to the first axle shaft and a first offset gear reduction assembly coupled to the first output assembly and the first electric machine. The second drive unit includes a second electric machine and a second gear assembly for transferring torque from the second electric machine to the second axle shaft. The second gear assembly includes a second output assembly coupled to the second axle shaft and a second offset gear reduction assembly coupled to the second output assembly and the second electric machine. The first electric machine and the second electric machine are orientated in a same direction. The first electric machine is spaced from the second electric such that the axle centerline axis is positioned between the first electric machine and the second electric machine. The first offset gear reduction assembly is spaced from the second offset gear reduction assembly such that the axle centerline axis is positioned between the first offset gear reduction and the second offset gear reduction.

In another embodiment of the present invention, an axle assembly is provided. The axle assembly includes a first wheel end assembly, a second wheel end assembly, and a drive unit that is coupled to the first wheel end assembly and the second wheel end assembly. The drive unit includes drive unit housing, a first drive unit and a second drive unit positioned within the drive unit housing, a first axle shaft, and a second axle shaft. The first axle shaft is orientated along an axle centerline axis and extends outwardly from the drive unit housing in a first direction that is defined along the axle centerline axis. The first axle shaft is coupled to the first wheel end assembly such that the first wheel end assembly is spaced from the drive unit housing. The second axle shaft is orientated coaxially with the first axle shaft along the axle centerline axis and extends outwardly from the drive unit housing in a second direction opposite the first direction. The second axle shaft is coupled to the second wheel end assembly such that the second wheel end assembly is spaced from the drive unit housing. The first drive unit includes a first electric machine and a first gear assembly for transferring torque from the first electric machine to the first axle shaft. The first gear assembly includes a first output assembly coupled to the first axle shaft and a first offset gear reduction assembly coupled to the first output assembly and the first electric machine. The second drive unit includes a second electric machine and a second gear assembly for transferring torque from the second electric machine to the second axle shaft. The second gear assembly includes a second output assembly coupled to the second axle shaft and a second offset gear reduction assembly coupled to the second output assembly and the second electric machine. The first electric machine and the second electric machine are orientated in a same direction. The first electric machine is spaced from the second electric machine such that the axle centerline axis is positioned between the first electric machine and the second electric machine. The first offset gear reduction assembly is spaced from the second offset gear reduction assembly such that the axle centerline axis is positioned between the first offset gear reduction and the second offset gear reduction.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION

Figure 1:
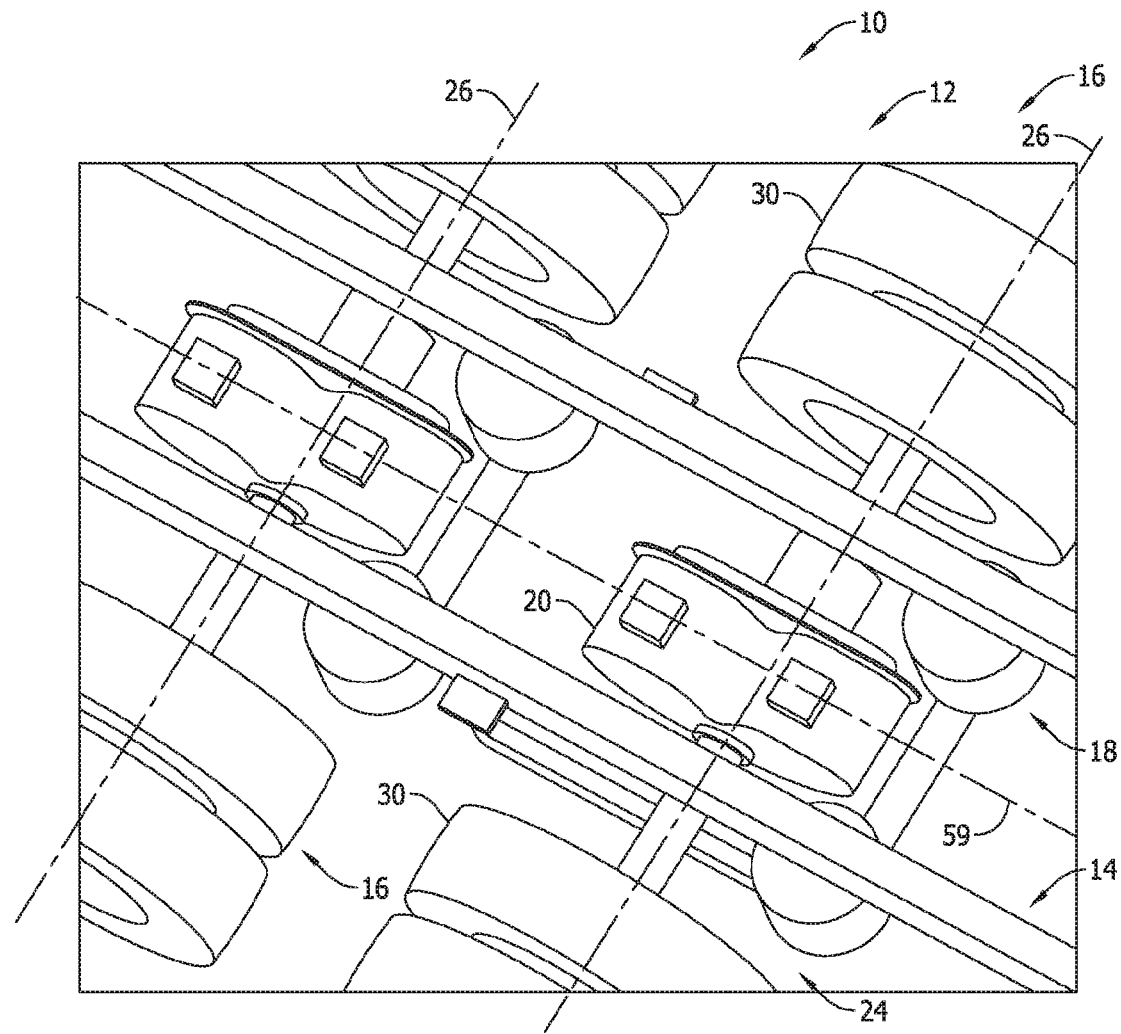
FIG. 1 is a perspective view of a vehicle including an axle assembly, according to an embodiment of the present invention.
Figure 2:
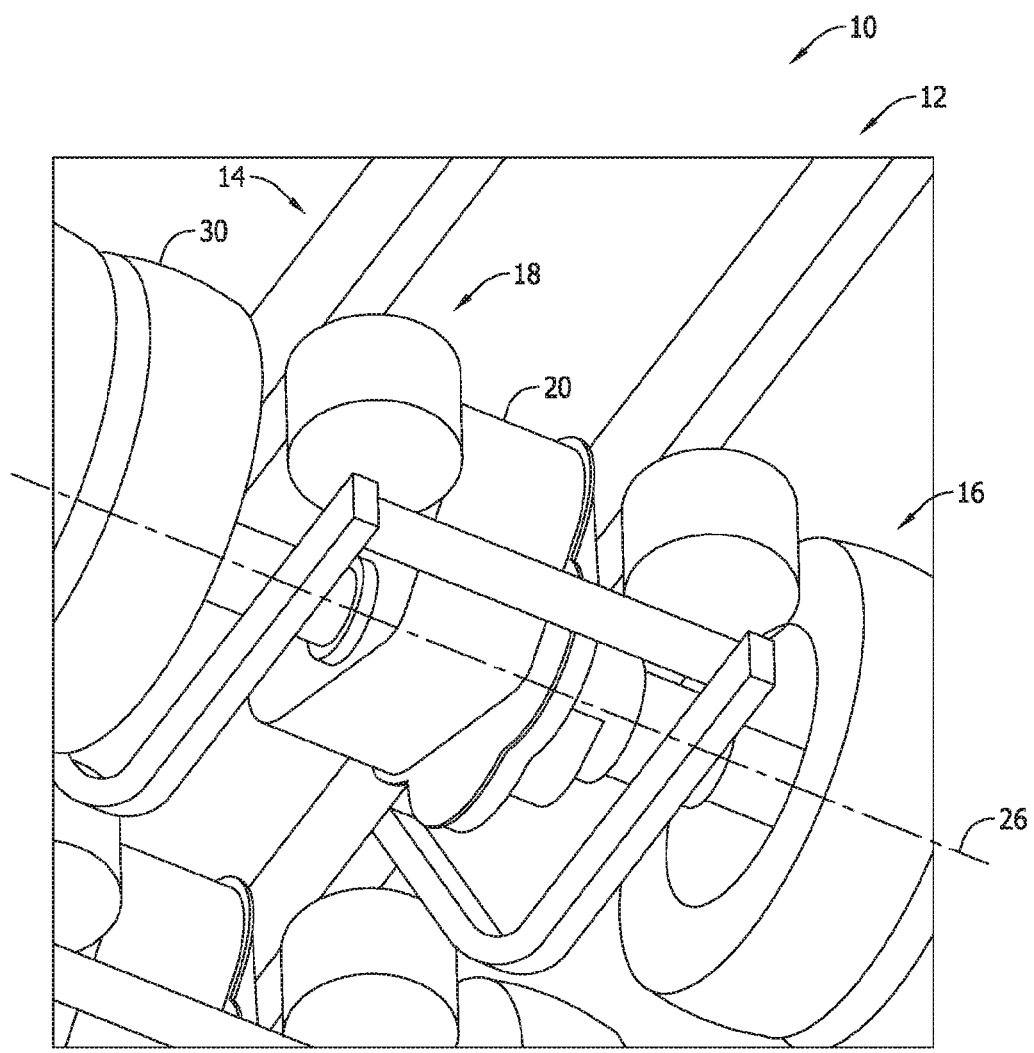
FIGS. 2-3 are additional perspective views of the vehicle shown in FIG. 1.
Figure 3:
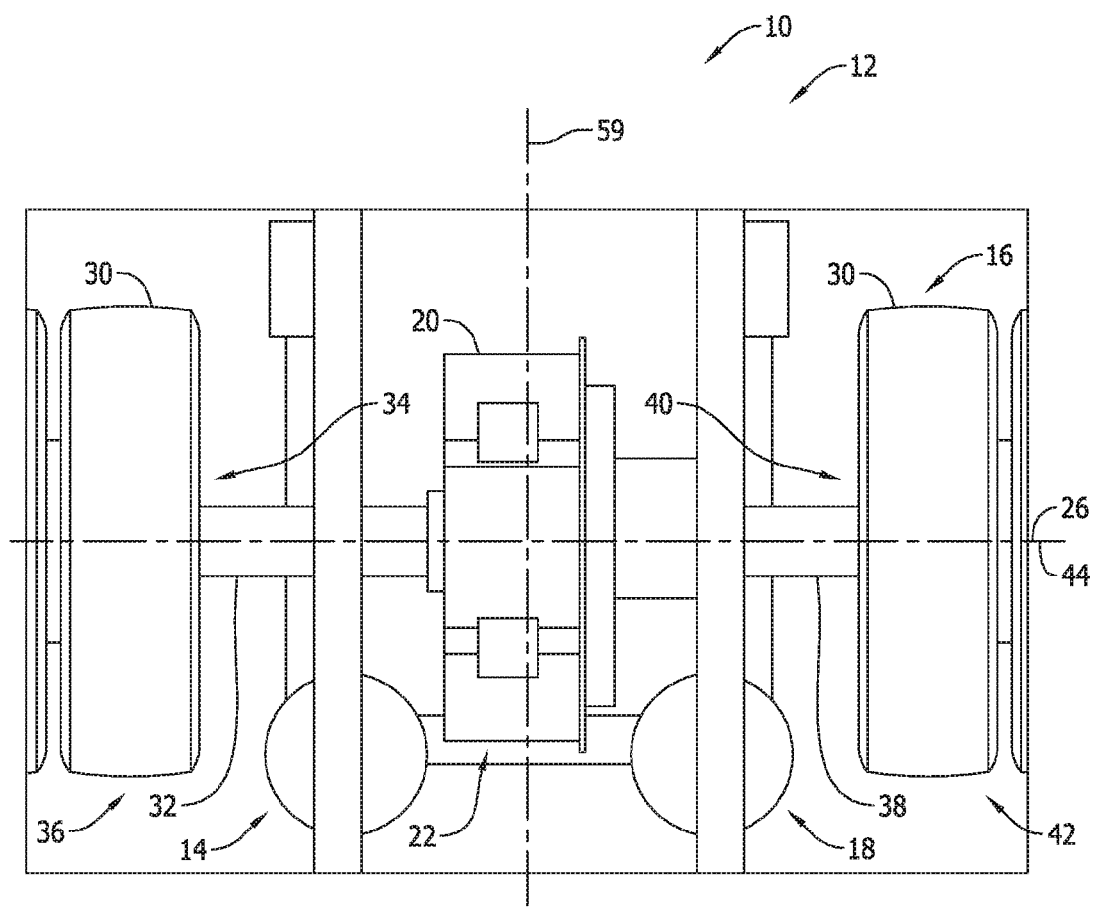
Figure 4:
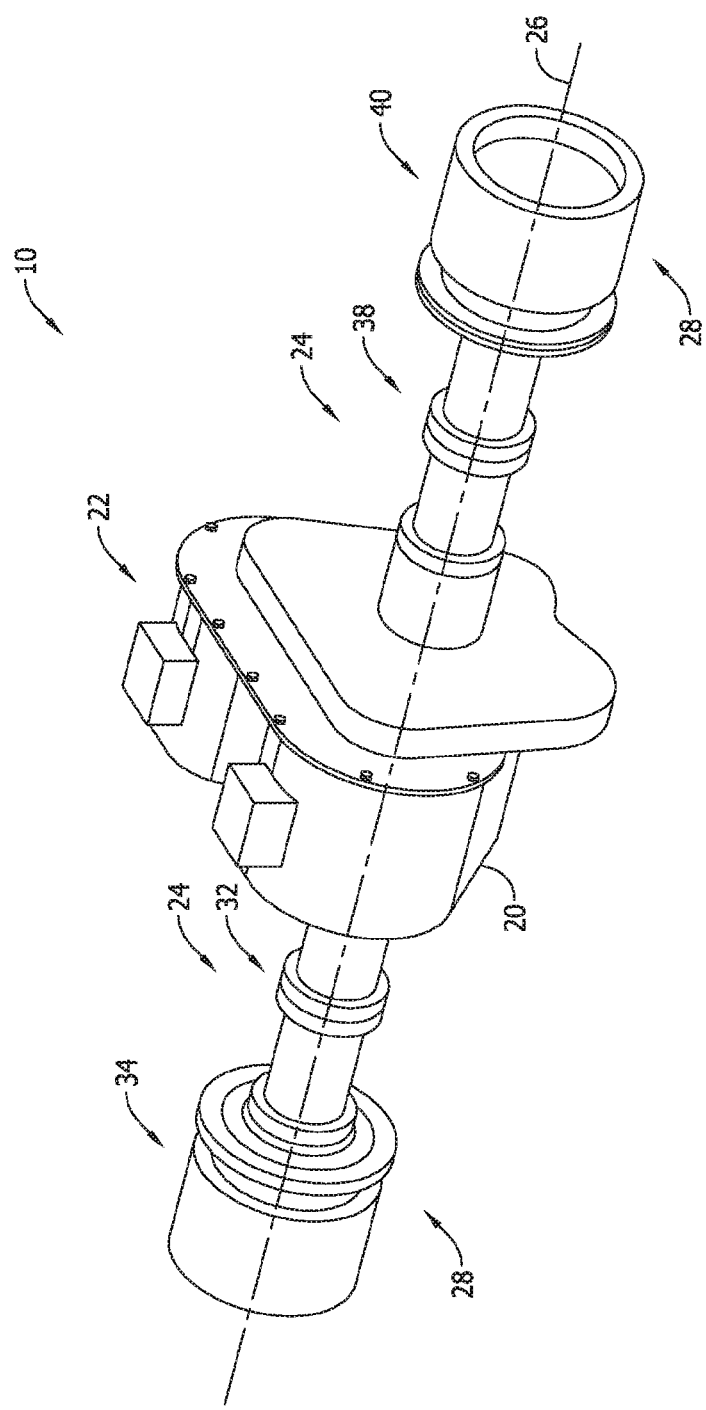
FIG. 4 is a perspective view of the axle assembly shown in FIGS. 1-3.
Figure 5:
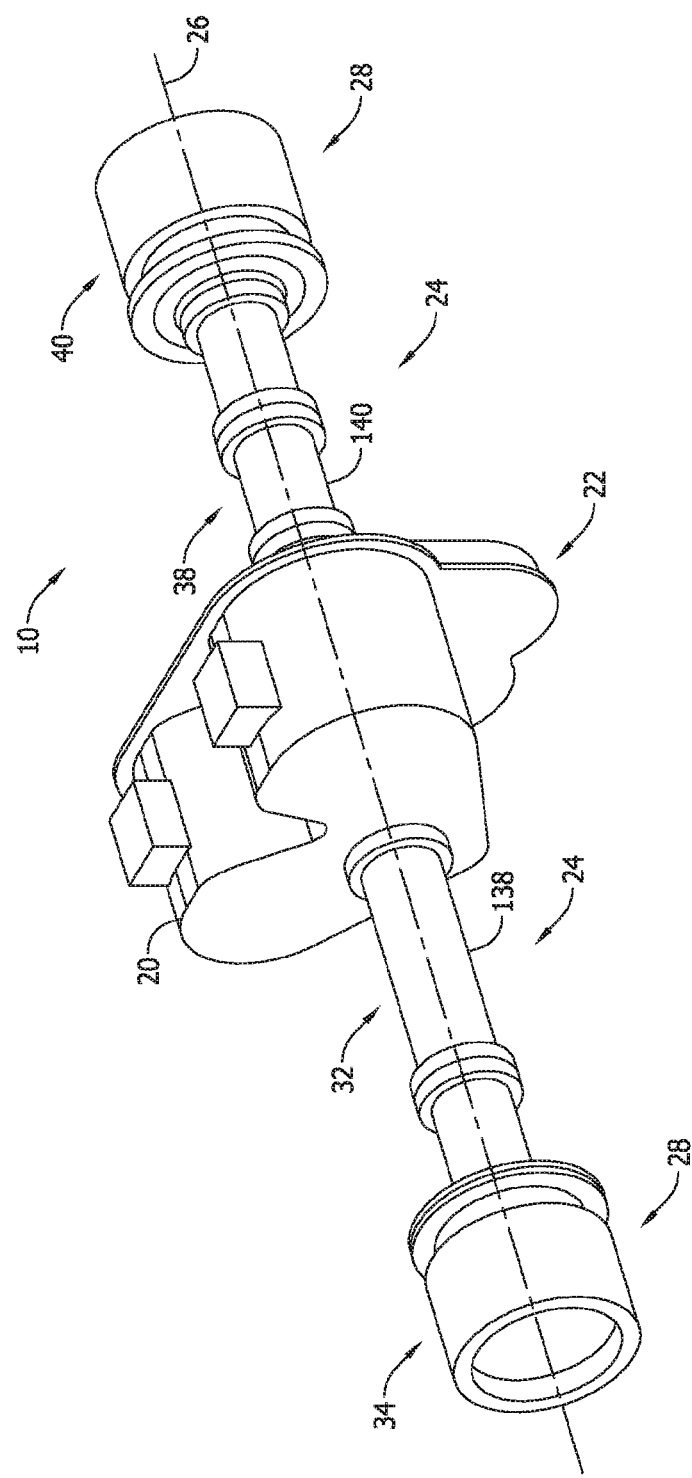
FIG. 5 is another perspective view of the axle assembly shown in FIG. 4.
Figure 6:
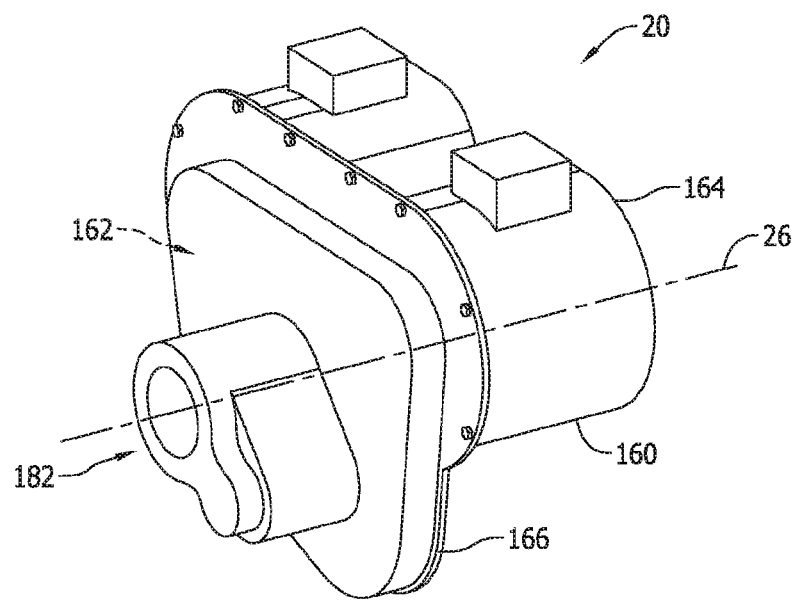
FIGS. 6-9 are various perspective views of a housing that may be used with the axle assembly shown in FIGS. 1-13.
Figure 7:
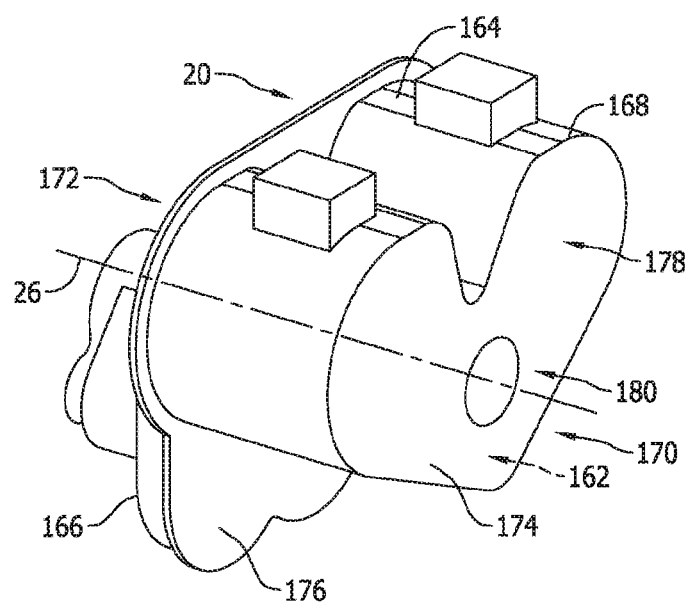
Figure 8:
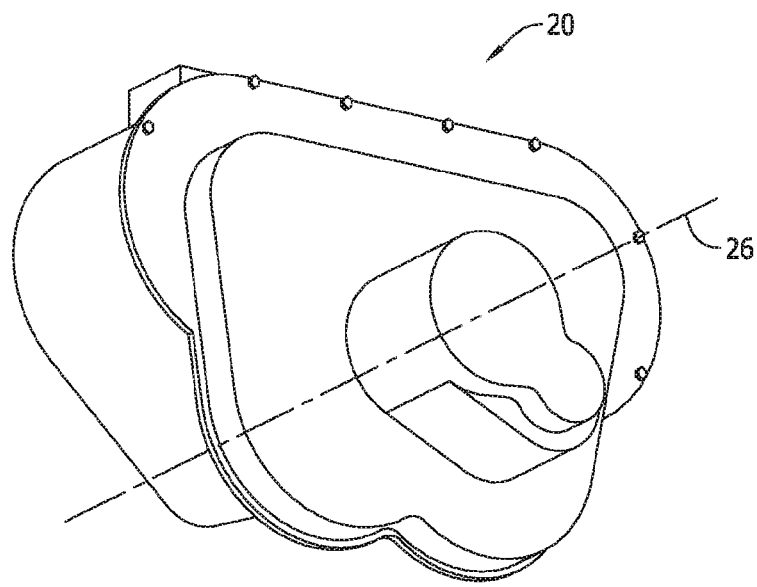
Figure 9:
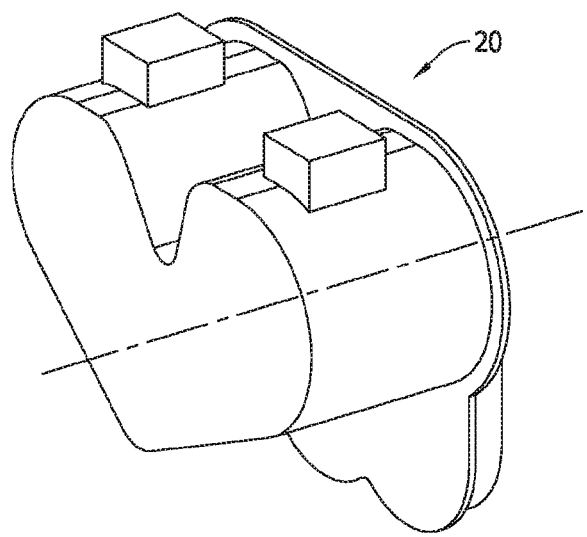
Figure 10:
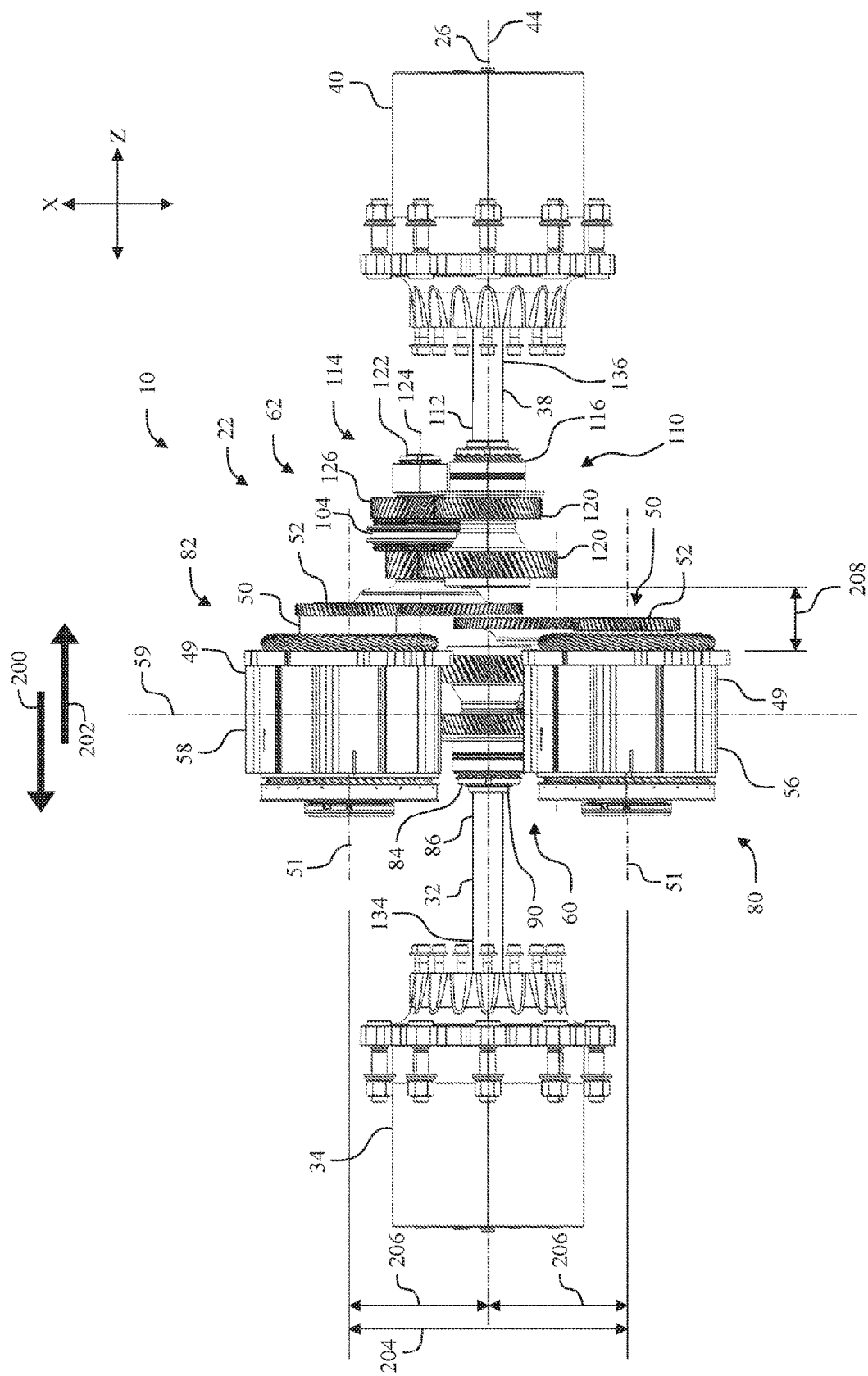
FIG. 10 is a top view of the axle assembly shown in FIG. 4 with the housing removed.
Figure 11:
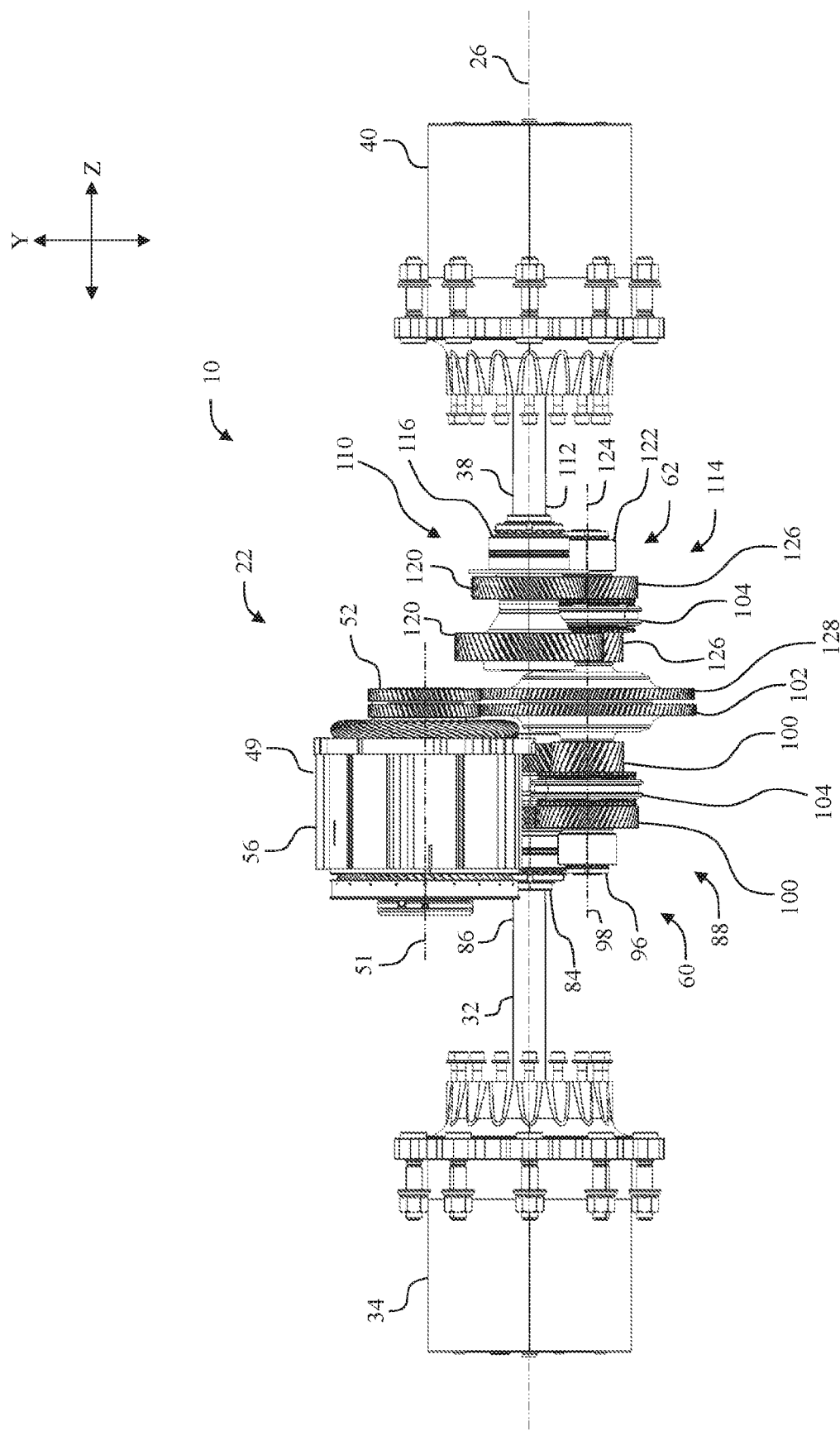
FIG. 11 is a side view of the axle assembly shown in FIG. 10.
Figure 12:
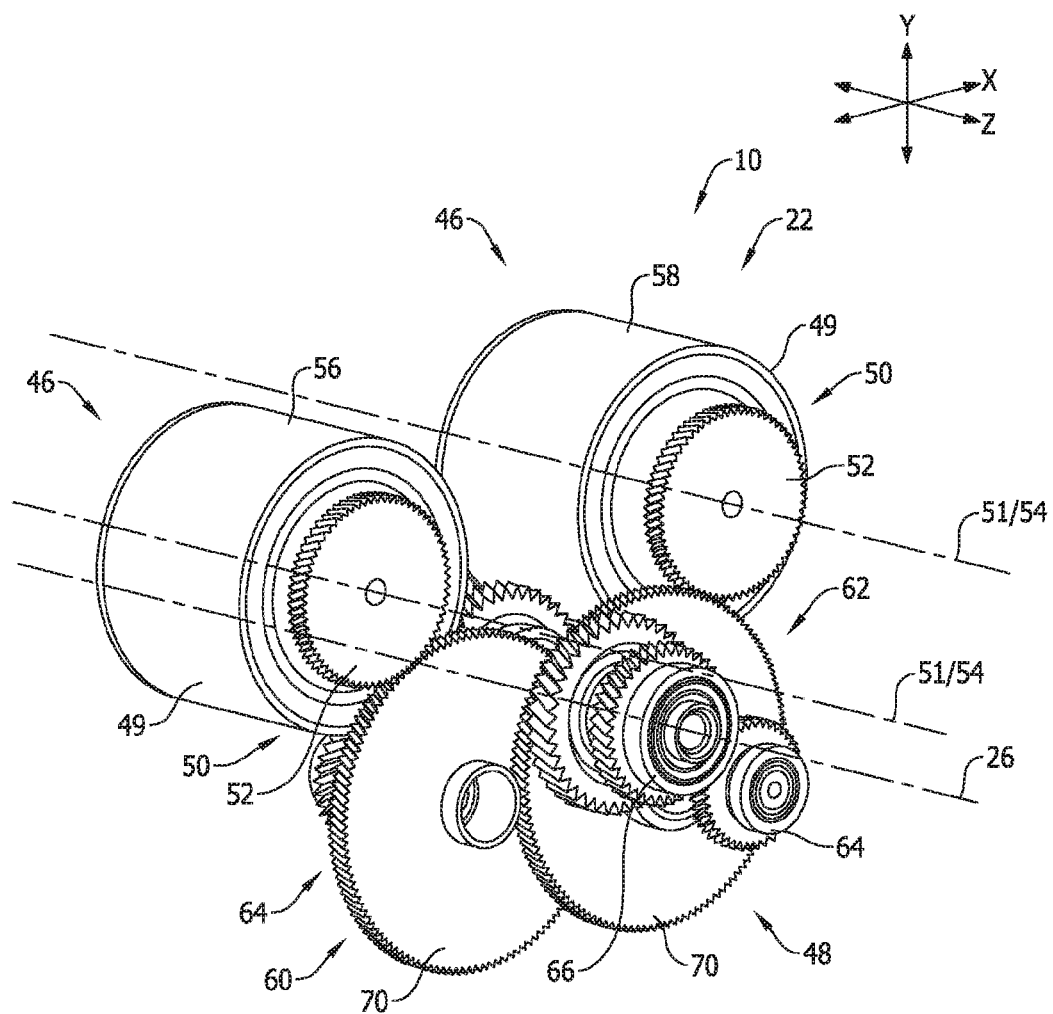
FIG. 12 is a perspective view of a drive unit that may be used with the axle assembly shown in FIGS. 1-11.
Figure 13:
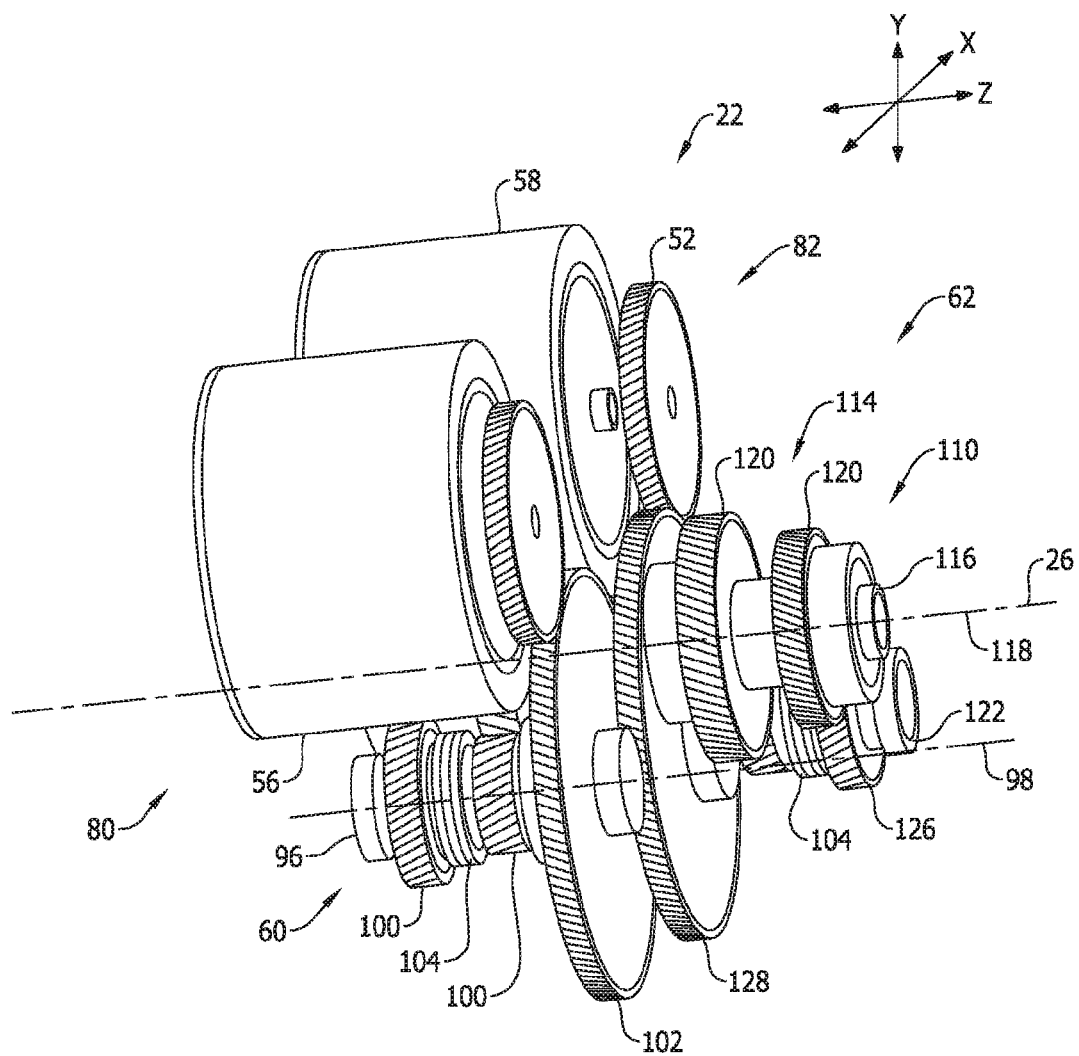
FIGS. 13 and 14 are additional perspective views of the drive unit shown in FIG. 12.
Figure 14:
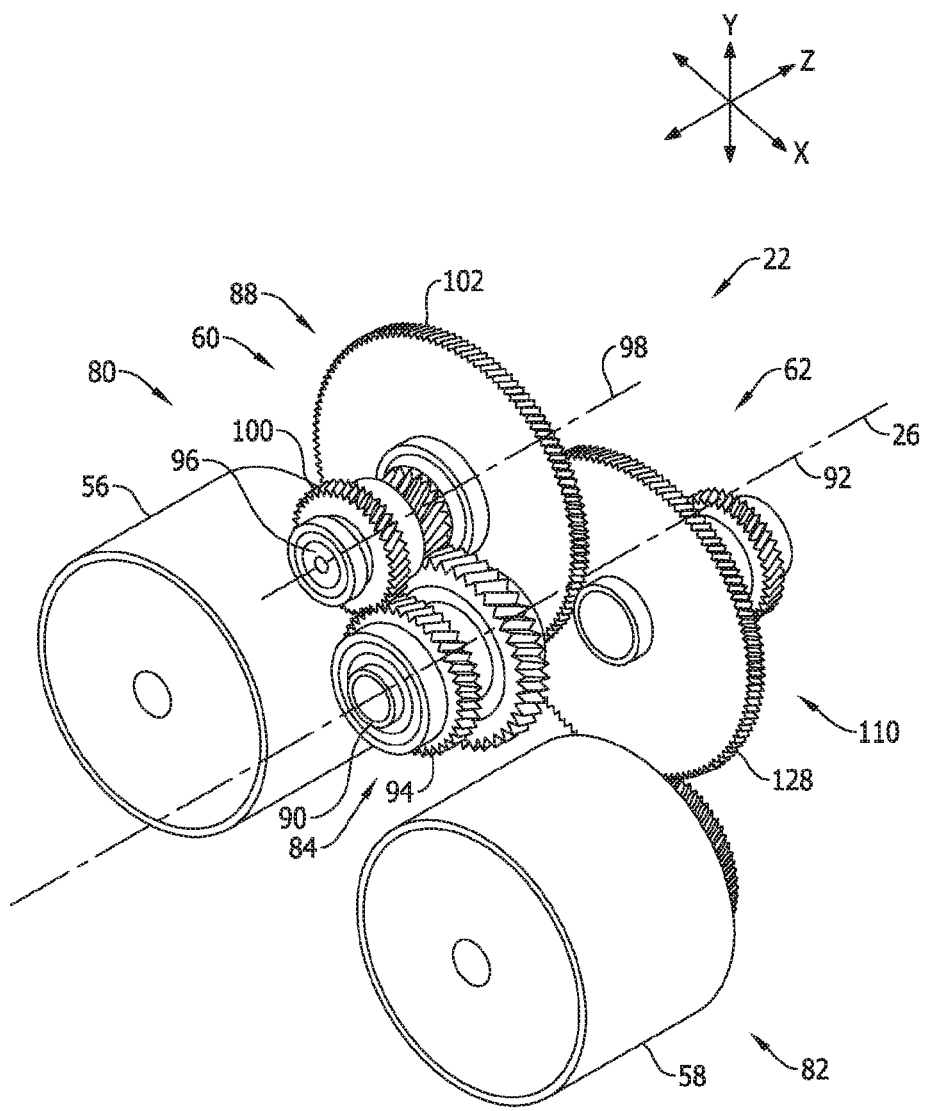

With reference to the Figures, wherein like numerals indicate like parts throughout the several views, the present invention includes an electric axle assembly 10 for use with a vehicle 12 such as, for example, a frame rail truck. Referring to FIGS. 1-5, in the illustrated embodiment, the vehicle 12 includes a frame rail system 14. A wheel assembly 16 is coupled to the electric axle assembly 10 for supporting the electric axle assembly 10 from a ground surface. A mounting assembly 18 is coupled to the frame rail system 14 and to the electric axle assembly 10 such that the frame rail system 14 is supported by the electric axle assembly 10 and the wheel assembly 16 from the ground surface. The mounting assembly 18 may include suspension arms that are coupled to one or more mounts to movably attach the axle assembly 10 to the vehicle 12. The vehicle may be an electric vehicle or a hybrid vehicle with an electric motor and internal combustion generator/motor. Advantageously, the mounting assembly 18 may be configured to retrofit the axle assembly 10 to a vehicle. For example, a frame rail truck originally equipped with a traditional axle assembly may utilize the axle assembly 10 in place of the traditional axle assembly.

In the illustrated embodiment, the electric axle assembly 10 includes a drive unit housing 20, a wheel drive unit 22 positioned within the drive unit housing 20, a pair of axle shafts 24 coupled to the wheel drive unit 22 and extending radially outwardly from opposite ends of the wheel drive unit 22 along an axle centerline axis 26, and a pair of wheel end assemblies 28. Each wheel end assembly 28 is coupled to an end of a corresponding axel shaft 24. The wheel assembly 16 includes one or more wheels 30 that are coupled to each end of the electric axle assembly 10 to support the vehicle 12 and transfer motive power to the ground surface. For example, the electric axle assembly 10 includes a first axle shaft 32 that is coupled between the drive unit 22 and a first wheel end assembly 34 that is coupled to a first pair 36 of wheels 30, and a second axle shaft 38 that is coupled between the drive unit 22 and a second wheel end assembly 40 that is coupled to a second pair 42 of wheels 30. The axle assembly 10 may further include a braking system for the vehicle. The braking system may include an air cylinder, brake hoses, brake drums, brake rotors, brake calipers, and the like.

In the embodiment shown, the wheel assembly 16 includes a dual wheel configuration with a pair of wheels 30 coupled to each end of the axle assembly 10. Each wheel 30 defines an axis of rotation 44. The axis of rotation 44 of each wheel 30 is generally aligned along the axle centerline axis 26. The vehicle 12 may include a plurality of electric axle assemblies 10. Each of the wheel drive units 22 may be configured to independently drive the wheels 30 and may operate the respective wheel 30 at a different speed during a turning maneuver of the vehicle, or in response to available traction at each wheel 30.

Referring to FIGS. 10-18, the wheel drive unit 22 includes a pair of electric machines 46 and a transmission assembly 48 coupled to each of the pair of electric machines 46 and to each axle shaft 24. The transmission assembly 48 is coupled to each of the electric machines 46 and to the first and second axle shafts 32, 38. As such, torque generated by each of the electric machines 46 is transferred through the transmission assembly 48 to each wheel end assembly 28, and then to the wheels 30. In one embodiment, the transmission assembly 48 has two reduction ratios, which may be selectively engaged by an operator of the vehicle, or a transmission controller.

Each electric machine 46 generates torque to drive the wheels 30. Each electric machine 46 includes an electric motor 49, a rotor shaft 50 that protrudes from the electric motor 49, and a drive pinion 52 that is fixed to the rotor shaft 50. The rotor shaft 50 extends along a rotor centerline axis 51 that defines a motor rotational axis 54 that extends through the electric machine 46. The electric machine 46 may be a DC or AC motor, brushed or brushless, and other types commonly known in the art.

In the illustrated embodiment, the pair of electric machines 46 includes a first electric machine 56 and a second electric machine 58 that are each orientated in the same direction and in parallel alignment such that the each rotor centerline axis 51 is oriented parallel to each other. The axle output shafts 24 are orientated along the same co-incident axis and extend in opposed directions. The first and second electric machines 56, 58 are oriented in parallel translated alignment and in a transverse direction on the vehicle 12 and orientated with the first electric machine 56 positioned behind the second electric machine 58 along a longitudinal axis 59 of the vehicle 12.

The transmission assembly 48 includes a first gear assembly 60 and a second gear assembly 62. The first gear assembly 60 is coupled to the first electric machine 56 and the first axle output shaft 32. The second gear assembly 62 is coupled to the second electric machine 58 and the second axle output shaft 38. Each first gear assembly 60 and second gear assembly 62 includes an idler shaft 64, an output shaft 66, and a shift mechanism 68 (shown in FIG. 17). A drive wheel 70 is fixed to the idler shaft 64 and meshes with the corresponding drive pinion 52. The drive wheel 70 transfers torque to the idler shaft 64 from the corresponding drive pinion 52. The shift mechanism 68 is configured to transfer torque between the idler shaft 64 and the output shaft 66. Each output shaft 66 is coupled to a corresponding axle shaft 32, 38.

In the illustrated embodiment, the wheel drive unit 22 includes a first drive unit assembly 80 and a second drive unit assembly 82. The first drive unit assembly 80 includes the first electric machine 56 and the first gear assembly 60 for transferring torque from the first electric machine 56 to the first axle shaft 32. The first gear assembly 60 includes a first output assembly 84 that is coupled to a proximal end 86 of the first axle shaft 32 and a first offset gear reduction assembly 88 that is coupled to the first output assembly 84 and to the first electric machine 56. The first offset gear reduction assembly 88 is coupled to the drive pinion 52 of the first electric machine 56 for transferring torque from the first electric machine 56 to the first output assembly 84.

The first output assembly 84 includes a first output shaft 90 extending along a first output shaft centerline axis 92 and a first plurality of output gears 94 that are fixedly coupled to the first output shaft 90 and spaced along the first output shaft centerline axis 92. The output gears 94 are rotatably fixed to the first output shaft 90 such that the output gears 94 and the first output shaft 90 rotate at the same speed. The first output shaft 90 defines a bore extending therethrough. The bore is configured to receive the proximal end 86 of the first axle shaft 32 and may be splined or keyed such that the first axle shaft 32 and the first output shaft 90 rotate at the same speed.

Figure 17:
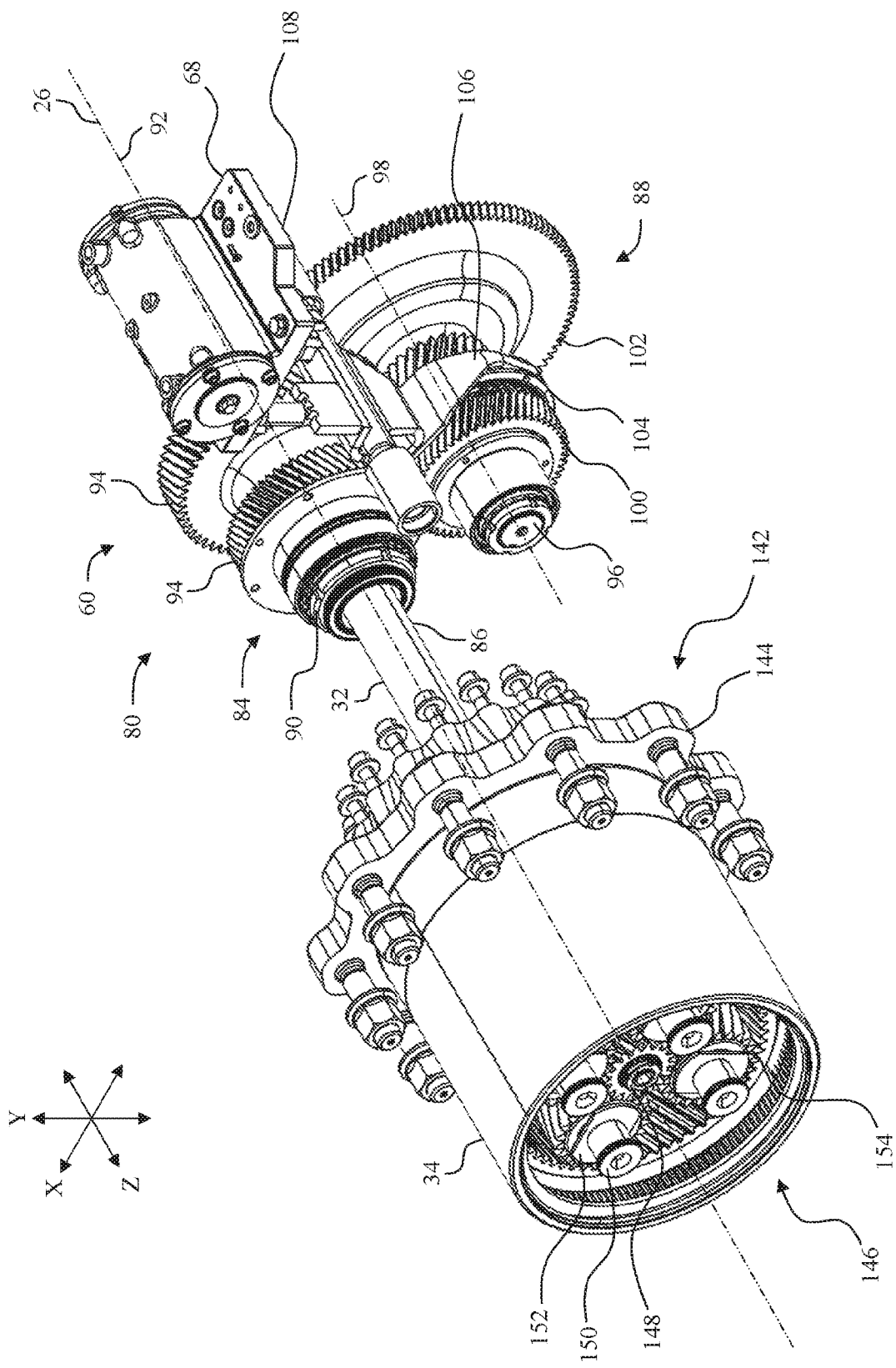
FIG. 17 is a perspective view of a portion of the axle assembly shown in FIG. 10.

The first offset gear reduction assembly 88 includes a first idler shaft 96 extending along a first idler shaft centerline axis 98, a first plurality of idler gears 100 that are rotatably coupled to the first idler shaft 96 and spaced along the first idler shaft centerline axis 98, and a shift mechanism 68 (shown in FIG. 17).

The first idler shaft 96 is orientated substantially parallel with the first output shaft 90. Each idler gear 100 is configured to mesh with a corresponding output gear 94 such that a rotation of an idler gear 100 causes a rotation of the corresponding output gear 94. Each idler gear 100 includes a splined portion engageable with the shift mechanism 68 to rotatably couple the idler gear 100 to the first idler shaft 96. The shift mechanism 68 is coupled to the first idler shaft 96 for selectively transferring torque from the first idler shaft 96 to each of the first plurality of idler gears 100.

The first idler shaft 96 and the first output shaft 90 each have two ends rotatably supported by bearings in the drive unit housing 20. A first drive wheel 102 is fixed to the first idler shaft 96 and meshes with the drive pinion 52 of the first electric machine 56. The first drive wheel 102 transfers torque to the first idler shaft 96 from the drive pinion 52 of the first electric machine 56.

Referring to FIG. 17, in the illustrated embodiment, the shift mechanism 68 includes a shift ring 104, a shift fork 106, and a shift actuator 108. The shift ring 104 is slideable along the first idler shaft 96 between the idler gears 100 and is rotatably coupled to the first idler shaft 96 such that the shift ring 104 and the first idler shaft 96 rotate at the same speed. The shift ring 104 includes at least one splined portion engageable with the splined portion of either of the idler gears 100. Additionally, the shift ring 104 defines a groove that is sized and shaped to engage the shift fork 106. The shift fork 106 is coupled to the shift actuator 108 and movable with respect to the first idler shaft 96. The shift fork 106 is engaged with the shift ring 104 such that the shift fork 106 is capable of moving the shift ring 104 into engagement with one of the idler gears 100. Additionally, the shift fork 106 may be movable into a neutral position where neither of the idler gears 100 are engaged with the shift ring 104.

In one embodiment, the first gear assembly 60 includes a 2-speed transmission that includes a first reduction ratio and a second reduction ratio. The 2-speed transmission includes a first pair of output gears 94 spaced along the first output shaft 90, and a corresponding first pair of idler gears 100 spaced along the first idler shaft 96. Each idler gear of the first pair of idler gears 100 is configured to mesh with a corresponding output gear of the first pair of output gears 94. One of the idler gears 100 of the first pair of idler gears 100 corresponds to the first reduction ratio, and the other idler gear 100 of the first pair of idler gears 100 corresponds to the second reduction ratio. The shift actuator 108 moves the shift fork 106 causing the shift ring 104 to move along the first idler shaft 96 selectively engage the idler gears 100 to select the first reduction ratio and the second reduction ratio. Each of the idler gears 100 can spin freely on the first idler shaft 96 such that when the corresponding reduction ratio is not engaged, no torque is transferred between the first idler shaft 96 and the corresponding idler gear 100.

The second drive unit assembly 82 is similar to the first drive unit assembly 80 and includes the second electric machine 58 and the second gear assembly 62 for transferring torque from the second electric machine 58 to the second axle shaft 38. The second gear assembly 62 includes a second output assembly 110 that is coupled to a proximal end 112 of the second axle shaft 38 and a second offset gear reduction assembly 114 that is coupled to the second output assembly 110 and to the second electric machine 58. The second offset gear reduction assembly 114 is coupled to the drive pinion 52 of the second electric machine 58 for transferring torque from the second electric machine 58 to the second output assembly 110.

The second output assembly 110 includes a second output shaft 116 extending along a second output shaft centerline axis 118 and a second plurality of output gears 120 that are spaced along the second output shaft centerline axis 118. The output gears 120 are rotatably fixed to the second output shaft 116 such that the output gears 120 and the second output shaft 116 rotate at the same speed. The second output shaft 116 defines a bore configured to receive the proximal end 112 of the second axle shaft 38 and may be splined or keyed such that the second axle shaft 38 and the second output shaft 116 rotate at the same speed.

The second offset gear reduction assembly 114 includes a second idler shaft 122 extending along a second idler shaft centerline axis 124 and a second plurality of idler gears 126 that are rotatably coupled to the a second idler shaft 122 and spaced along the second idler shaft centerline axis 124. The second idler shaft 122 is orientated substantially parallel with the second output shaft 116. Each idler gear 126 is configured to mesh with a corresponding output gear 120 such that a rotation of an idler gear 126 causes a rotation of the corresponding output gear 120. A second shift mechanism 68 is coupled to the second idler shaft 122 for selectively transferring torque from the second idler shaft 122 to each of the second plurality of idler gears 126. Each idler gear 126 includes a splined portion engageable with the second shift mechanism 68 to rotatably couple the idler gear 126 to the second idler shaft 122. In the illustrated embodiment, the second offset gear reduction assembly 114 includes a separate second shift mechanism 68 to enable the second drive unit assembly 82 to be operated independently of the first drive unit assembly 80. In another embodiment, a single shift mechanism may is used to operate both the first drive unit assembly 80 and the second drive unit assembly 82.

In the illustrated embodiment, the second idler shaft 122 and the second output shaft 116 each have two ends rotatably supported by bearings in the drive unit housing 20. A second drive wheel 128 is fixed to the second idler shaft 122 and meshes with the drive pinion 52 of the second electric machine 58. The second drive wheel 128 transfers torque to the second idler shaft 122 from the drive pinion 52 of the second electric machine 58. The first drive wheel 102 includes a first diameter 130 and the second drive wheel 128 includes a second diameter 132 that is substantially equal to the first diameter 130.

The second shift mechanism 68 is similar to the first shift mechanism 68 and includes a second shift ring 104, a shift fork 106, and a shift actuator 108. The second shift ring 104 is slideable along the second idler shaft 122 between the idler gears 126 and is rotatably coupled to the second idler shaft 122 such that the second shift ring 104 and the second idler shaft 122 rotate at the same speed. The second shift ring 104 includes at least one splined portion engageable with the splined portion of either of the idler gears 126 and defines a groove that is sized and shaped to engage the shift fork 106.

In one embodiment, the second gear assembly 62 includes a 2-speed transmission that includes a first reduction ratio and a second reduction ratio. The 2-speed transmission includes a second pair of output gears 120 spaced along the second output shaft 116, and a corresponding second pair of idler gears 126 spaced along the second idler shaft 122. Each idler gear of the second pair of idler gears 126 is configured to mesh with a corresponding output gear of the second pair of output gears 120. One of the idler gears 126 of the second pair of idler gears 126 corresponds to the first reduction ratio, and the other idler gear 126 of the second pair of idler gears 126 corresponds to the second reduction ratio. The shift actuator 108 moves the shift fork 106 causing the second shift ring 104 to move along the second idler shaft 122 selectively engage the idler gears 126 to select the first reduction ratio and the second reduction ratio. Each of the idler gears 126 can spin freely on the second idler shaft 122 such that when the corresponding reduction ratio is not engaged, no torque is transferred between the second idler shaft 122 and the corresponding idler gear 126.

The shift mechanisms may further include a synchronizer to aid shifting. The shift actuators may be controlled manually or automatically. The shift actuators may be responsive to hydraulic pressure, pneumatic pressure, or electronic signals generated by a transmission control module. Alternatively, the shift actuators may include a mechanical linkage controlled by the vehicle operator.

The first wheel end assembly 34 is coupled to a distal end 134 of the first axle shaft 32 and the second wheel end assembly 40 is coupled to the distal end 136 of the second axle shaft 38. The first axle shaft 32 is disposed in a first spindle 138 (shown in FIG. 5) that is coupled to the drive unit housing 20. The second axle shaft 38 is disposed in a second spindle 140 that is coupled to the drive unit housing 20. Referring to FIG. 17, in the illustrated embodiment, each wheel end assembly 34, 40 includes a wheel hub 142 having a wheel flange 144. The wheel hub 142 is rotatably supported on a corresponding spindle 138, 140 by a pair of hub bearings. The wheels 30 may be secured to the wheel flange 144 using bolts, nuts, and other fasteners known in the art. Each wheel end assembly 34, 40 includes a planetary reduction 146, which increases torque to drive the wheels 30. The planetary reduction 146 includes a sun gear 148, a planet carrier 150, a plurality of planet gears 152, and a ring gear 154. The ring gear 154 is coupled to the corresponding spindle 138, 140. The sun gear 148 is coupled to the distal end of the corresponding axle shaft 32, 38 and disposed in the ring gear 154. The ring gear 154 is fixed relative to the sun gear 148. The plurality of planet gears 152 are rotatably coupled to the planet carrier 150. The planet carrier 150 is arranged adjacent to the ring gear 154 with each planet gear 152 disposed in the ring gear 154. Each planet gear 152 engages both the ring gear 154 and the sun gear 148. When the axle shaft rotates the sun gear 148, the sun gear 148 rotates each planet gear 152, which in turn rotates the planet carrier 150. The planet carrier 150 is coupled to the wheel hub 142 such that the planet carrier 150 and the wheel hub 142 rotate at the same speed.

In the illustrated embodiment, the first drive unit assembly 80 is configured to drive the first wheel end assembly 34, and the second drive unit assembly 82 is configured to drive the second wheel end assembly 40 independently from the first drive unit assembly 80 to operate the first wheel end assembly 34 and the second wheel end assembly 40 at different speeds during a turning maneuver of the vehicle, or in response to available traction at each wheel 30.

Referring to FIGS. 6-9, in the illustrated embodiment, the drive unit housing 20 includes a plurality of walls 160 including an inner surface defining a cavity 162. The first drive unit assembly 80 and the second drive unit assembly 82 are disposed entirely within the cavity 162 of the drive unit housing 20. The drive unit housing 20 includes a housing case 164 and a cover 166 that is removably coupled to the housing case 164. The housing case 164 includes a body including a plurality of walls 160 having an inner surface and an outer surface 168. The inner surface defines the cavity 162 that is sized and shaped to receive the drive unit 22 therein. The outer surface 168 extends between a front-side portion 170 and a back-side portion 172 along the axle centerline axis 26. The housing case 164 includes a first endwall 174 defined at the front-side portion 170 and a second endwall 176 defined at the back-side portion 172. The first endwall 174 includes a substantially heart-shaped cross-sectional shape 178. The outer surface 168 of the housing case 164 includes a plurality of arcuate surfaces extending between the first endwall 174 and the second endwall 176 such that the heart-shaped cross-sectional shape 178 extends between the first endwall 174 and the second endwall 176. A first shaft opening 180 extends through first endwall 174 and is sized and shaped to receive the first axle shaft 32 therethrough.

The second endwall 176 includes a mounting shoulder that extends around a perimeter of the second endwall 176 and includes a planar front surface. A plurality of holes are defined along the front surface for receiving corresponding fasteners therein to facilitate coupling the cover 166 to the housing case 164.

The cover 166 is coupled to the second endwall 176 and includes a second shaft opening 182 that extends through an outer surface of the cover 166. The second shaft opening 182 is sized and shaped to receive the second axle shaft 38 therethrough.

The cover 166 includes a cover body and a mounting flange that extends outwardly form the cover body. The mounting flange includes an outer surface having a cross-sectional shape that substantially matches the cross-sectional shape of the perimeter of second endwall 176. The mounting flange includes a plurality of openings extending around a perimeter of the mounting flange that are sized and shaped to receive fasteners therethrough to facilitate coupling the cover 166 to the housing case 164. The cover 166 is adapted to be coupled to the housing case 164 to enclose the drive unit 22 within the gearbox cavity 162. The first axle shaft 32 is disposed in the first spindle 138 that is coupled to the housing case 164. The second axle shaft 38 is disposed in the second spindle 140 that is coupled to the cover 166. One or more tie-rods are coupled to the housing case 164 for supporting the drive unit 22 from the frame rail system 14.

Referring to FIGS. 10-18, in the exemplary embodiment, three mutually perpendicular axes X, Y, and Z extend through the axle assembly 10, and are used to define a three-dimensional Cartesian coordinate system relative to axle assembly 10. Specifically, the Z-axis is orientated to extend substantially parallel with axle centerline axis 26, the X-axis is oriented to extend substantially perpendicular to the Z-axis and substantially parallel with longitudinal axis 59, and the Y-axis is oriented substantially perpendicular to the X-axis and the Y-axis. In the illustrated embodiment, the gear arrangement of the drive unit 22 includes a family unit including having an orientation of the gears that allows for drive to each wheel 30 while packaging both electric machines 46 in the same orientation direction and with one electric machine behind the other along the longitudinal axis 59. The primary gear form is a "W" configuration (shown in FIG. 18) with respect to the X-Y plane, with the output shafts 90, 116 having the same co-incident axis but with opposed directions with respect to the axle centerline axis 26. The electric machines 34, 40 instead of being opposite have been rotated to give parallel translated alignment, in a transverse direction on the vehicle one behind the other along the longitudinal axis 59.

Figure 18:
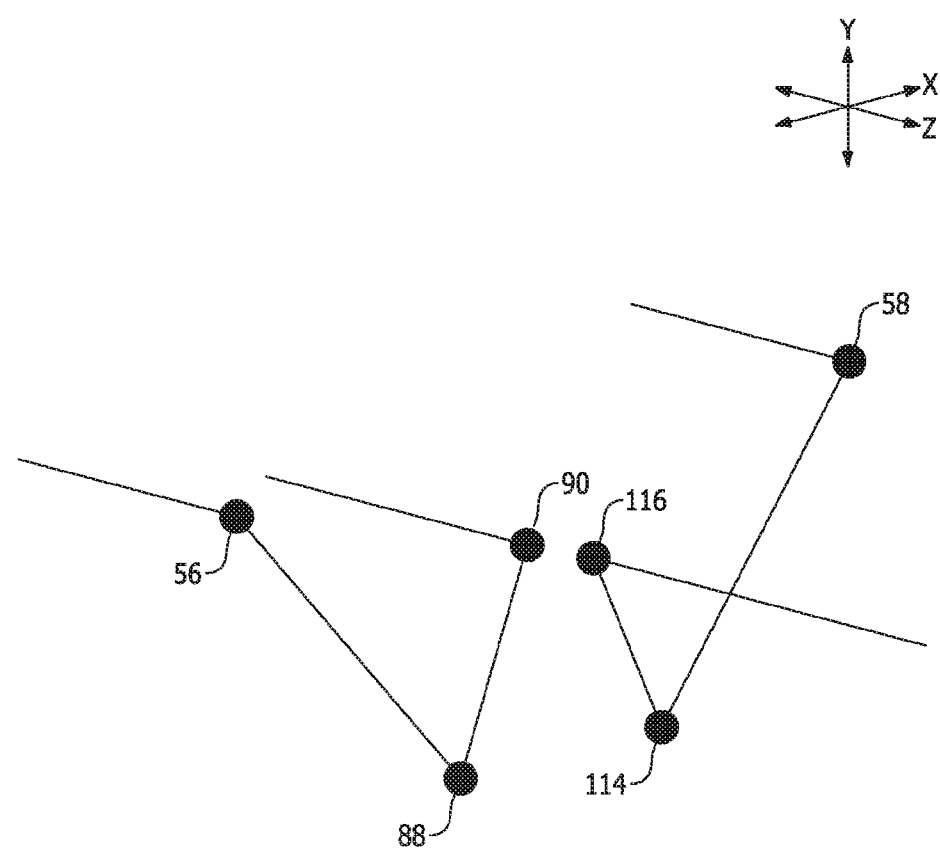
FIG. 18 is a schematic view of the drive unit shown in FIG. 12 illustrating the node layout of a primary gear form in a "W" configuration including a first drive unit assembly in an opposing arm "V" configuration and a second drive unit assembly in a trailing arm "V" configuration.

In one embodiment, the input reduction gear pair set from the electric machine has a large diameter gear which will not allow passage of shafts. This feature forces an offset axle shaft 64 configuration for the independent wheel drive unit system 22. Referring to FIG. 18, the configuration is arranged with two "V" shapes with respect to the X-Y plane forming a "W" shape. One of the "V" shapes has a trailing arm configurations along the Z-axis and the other has an opposed arms configuration along the Z-axis. When aligned together, the "W" shape includes aligned inputs (electric machine with the same orientation) and opposed outputs. The outputs are connected in opposite directions for drive shafts to the wheel ends. The configuration shapes allows packaging into the tight space between the chassis rails with the two motor axle configuration while maintaining the independent wheel drive and multi speed gear reduction capability. The configuration also utilizes for adaptability of axle ratio and vehicle product type, by utilizing the companies wheel end planetary reductions.

Referring to FIGS. 10-16, in the illustrated embodiment, the first axle shaft 32 is orientated along the axle centerline axis 26 and extends outwardly from the drive unit housing 20 in a first direction 200 (shown in FIG. 10) defined along the axle centerline axis 26. The second axle shaft 38 is orientated coaxially with the first axle shaft 32 along the axle centerline axis 26 and extends outwardly from the drive unit housing 20 in a second direction 202 defined along the axle centerline axis 26 that is opposite the first direction 200.

Figure 15:
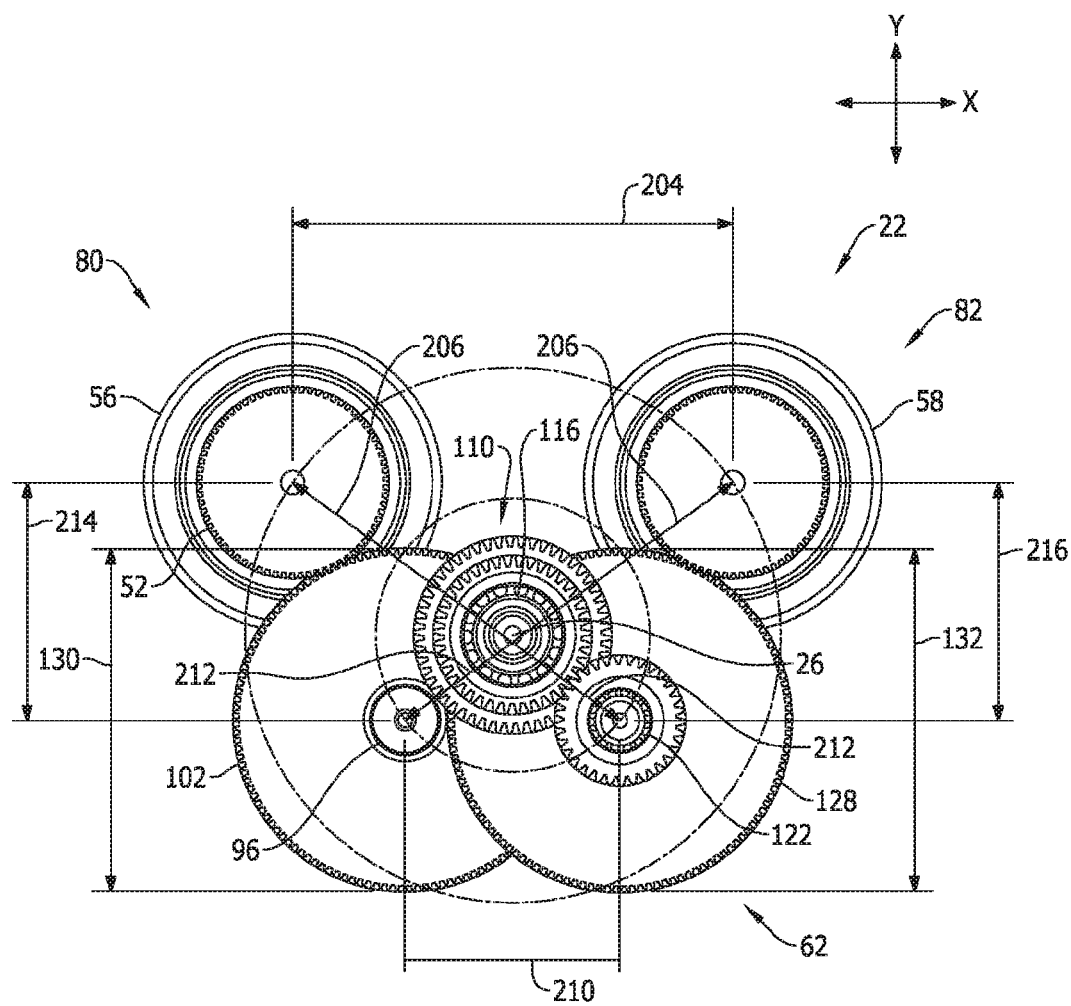
FIG. 15 is a front elevation view of the drive unit shown in FIG. 12.
Figure 16:
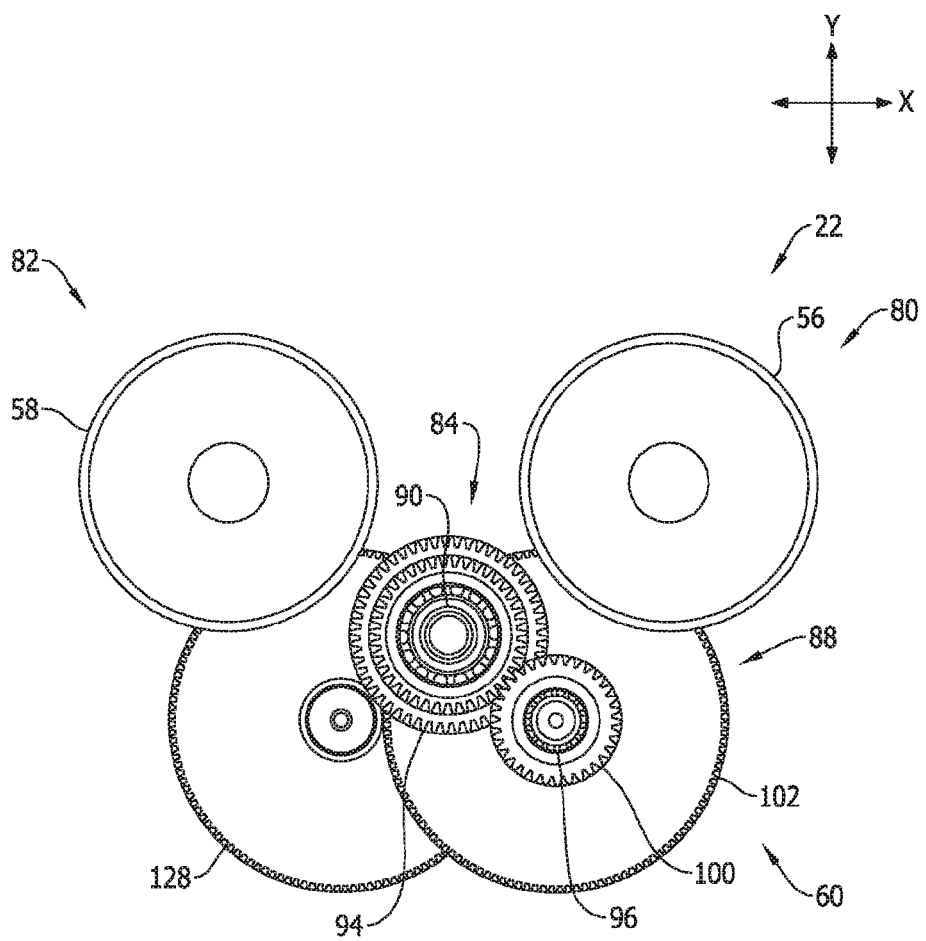
FIG. 16 is a rear elevation view of the drive unit shown in FIG. 12.

The first drive unit assembly 80 is coupled to the first axle shaft 32 for driving the first wheel end assembly 34 that is coupled to the first axle shaft 32. The second drive unit assembly 82 is coupled to the second axle shaft 38 for driving the second wheel end assembly 40 that is coupled to the second axle shaft 38. The first electric machine 56 and the second electric machine 58 are orientated in a same direction with respect to the axle centerline axis 26. In addition, each rotor shaft 50 of the first electric machine 56 and the second electric machine 58 is orientated parallel to the axle centerline axis 26. The first electric machine 56 is spaced a distance 204 defined along the X-axis from the second electric machine 58 such that the axle centerline axis 26 is positioned between the rotor centerline axis 51 of the first electric machine 56 and the rotor centerline axis 51 of the second electric machine 58. For example, in one embodiment, the first electric machine 56 and the second electric machine 58 are orientated along a horizontal plane (as shown in FIG. 15) with the first electric machine 56 spaced from the second electric machine 58 along the longitudinal axis 59 such that the axle centerline axis 26 is positioned between the rotor centerline axis 51 of the first electric machine 56 and the rotor centerline axis 51 of the second electric machine 58. In other embodiments, the first and second electric machines 56, 58 may be vertically orientated along the Y-axis and spaced apart such that the axle centerline axis 26 is positioned between the rotor centerline axis 51 of the first and second electric machines 56, 58, or along any axis perpendicular with the axle centerline axis 26 such that the rotor centerline axes 51 of the first and second electric machine 56, 58 are orientated in the same plane. In addition, each rotor shaft 50 of the first electric machine 56 and the second electric machine 58 is spaced a same radial distance 206 from the axle centerline axis 26.

In the illustrated embodiment, the first gear assembly 60 and the second gear assembly 62 are in a mirrored symmetrical relationship about the Y-axis. The first gear assembly 60 extends in the first direction 200 and the second gear assembly 62 extends in the opposite second direction 202.

The first output shaft 90 and the second output shaft 116 are orientated along the axle centerline axis 26. The first output shaft 90 is coupled to the proximal end 86 of the first axle shaft 32 and is orientated coaxially with the first axle shaft 32 along the axle centerline axis 26. The second output shaft 116 is coupled to the proximal end 112 of the second axle shaft 38 and orientated coaxially with the second axle shaft 38 along the axle centerline axis 26. The first output shaft 90 extends along the axle centerline axis 26 in the first direction 200, and the second output shaft 116 extends along the axle centerline axis 26 in the opposite second direction 202.

The first output shaft 90 is positioned along the axle centerline axis 26 such that the first output shaft 90 is positioned between the first electric machine 56 and the second electric machine 58 with respect to the X-axis. The second output shaft 116 is positioned along the axle centerline axis 26 such that the second output shaft 116 is spaced a distance 208 measured along the axle centerline axis 26 from the first and the second electric machines 56, 58.

The first offset gear reduction assembly 88 is offset a distance from the second offset gear reduction assembly 114 such that the axle centerline axis 26 is positioned between the first offset gear reduction assembly 88 and the second offset gear reduction assembly 114. For example, the first idler shaft 96 is spaced a distance 210 (shown in FIG. 15) measured along the X-axis from the second idler shaft 122 such that the axle centerline axis 26 extends between the first idler shaft 96 and the second idler shaft 122. The axle centerline axis 26 is positioned between the first and the second idler shafts 96, 122 along the X-axis. The first idler shaft 96 is orientated parallel to the second idler shaft 122, and each of the first idler shaft 96 and the second idler shaft 122 are orientated parallel to the axle centerline axis 26. In addition, the first idler shaft 96 and the second idler shaft 122 are spaced a same radial distance 212 from the axle centerline axis 26.

The first drive wheel 102 is positioned adjacent to the second drive wheel 128 with respect to the Z-axis. Each drive wheel 102, 128 has the same diameter such that a portion of an outer surface the first drive wheel 102 overlaps an outer surface the second drive wheel 128. The first idler shaft 96 extends from the first drive wheel 102 in the first direction 200 and the second idler shaft 122 extends from the second drive wheel 128 in the opposite second direction 202.

The first idler shaft 96 is spaced a first distance 214 measured along the Y-axis from the first electric machine 56 such that the axle centerline axis 26 is positioned between the first idler shaft 96 and the first electric machine 56. Similarly, the second idler shaft 122 is spaced a second distance 216 measured along the Y-axis from the second electric machine 58 such that the axle centerline axis 26 is positioned between the second idler shaft 122 and the second electric machine 58. In the illustrated embodiment, the first distance 214 is substantially equal to the second distance 216.

In one embodiment, an electric motor with a rotor shaft will drive and the offset gearing reduction. The output of the offset gearing reduction will input power to a shaft with several bearings, a selectable synchronizer/dog clutch and two gears, which a pair with two gears on the output shaft of the transmission, respectively. The synchronizer or dog clutch will select speeds for two ratios, which will transmit power to the output shaft with either gear pairs in the transmission. The output shaft of the transmission will couple to the input of the wheel hub planetary drive sun gear. In the wheel hub planetary drive, the ring gear will be held stationary while the planet carrier will output power to the wheels as in conventional wheel hub drives. Two electric motors, two 2-speed transmission units and two planetary wheel hub drives are required on one axle. The housing will integrate the electric motor and transmission compactly, supply cooling for heat dissipation and transmit vehicle loads to suspension components. The launch and velocity performance is achieved by utilizing two medium speed electric machines of modest performance, combined with the two speed transmission configuration give both launch performance and velocity performance.

The present invention may be used with a single axle system for boxed out sized applications and/or a double axle system for the heavy products.

The axle architecture configuration of the electric axle assembly 10 allows a two motor electric axle to package within the chassis rails of a standard truck with standard suspension. The double electric machine allows the system enough power for launch using smaller electric machines.

In one embodiment, the invention provides an electric drive axle of a low-floor or ultra-low floor (no step) vehicle. The vehicle is generally a high occupancy or heavy-duty vehicle with electric (all-battery or may be a hybrid) propulsion. The invention will allow a compact packaging for two 2-speed transmission unit, two electric motors and two wheel hub reduction gears for a rail frame vehicle. Having 2-speeds in the transmission unit will allow vehicle performance improvement tor top speed and motor efficiency. In addition, integrating the electric motor on the side of the transmission unit (i.e., parallel and adjacent) helps package the system compactly. Using a set of parallel shaft gears for reduction allows an offset to package the motor. The two-speed transmission unit will be integrated within the axle housing. Therefore, electric drive axle comprises two motors, two 2-speed transmission units, two hub reduction gears and an external axle housing, wherein the motors arc used for providing power for driving each wheel.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A drive unit for use with an axle assembly, the drive unit comprising: a drive unit housing;
   a first axle shaft orientated along an axle centerline axis and extending outwardly from the drive unit housing in a first direction defined along the axle centerline axis;
   a second axle shaft orientated coaxially with the first axle shaft along the axle centerline axis and extending outwardly from the drive unit housing in a second direction opposite the first direction;
   a first drive unit assembly positioned within the drive unit housing, the first drive unit assembly including a first electric machine and a first gear assembly for transferring torque from the first electric machine to the first axle shaft, the first gear assembly including a first output assembly coupled to the first axle shaft and a first offset gear reduction assembly coupled to the first output assembly and the first electric machine, wherein the first offset gear reduction assembly includes a first drive wheel and a first idler shaft that extends from the first drive wheel in the first direction; and
   a second drive unit assembly positioned within the drive unit housing, the second drive unit assembly including a second electric machine and a second gear assembly for transferring torque from the second electric machine to the second axle shaft, the second gear assembly including a second output assembly coupled to the second axle shaft and a second offset gear reduction assembly coupled to the second output assembly and the second electric machine wherein the second offset gear reduction assembly includes a second drive wheel and a second idler shaft that extends from the first drive wheel in the second direction;
   wherein the first electric machine is spaced from the second electric machine such that the axle centerline axis is positioned between the first electric machine and the second electric machine; and
   wherein the first offset gear reduction assembly is spaced from the second offset gear reduction assembly such that the axle centerline axis is positioned between the first offset gear reduction and the second offset gear reduction.

2. The drive unit of claim 1, wherein the first electric machine and the second electric machine are orientated in a same direction.

3. The drive unit of claim 1, wherein each of the first electric machine and the second electric machine includes a rotor shaft and an electric motor for rotating the rotor shaft, each rotor shaft orientated parallel to the axle centerline axis.

4. The drive unit of claim 3, wherein each rotor shaft is spaced a same radial distance from the axle centerline axis.

5. The drive unit of claim 1, wherein the first idler shaft and a first drive wheel is configured to mesh with a first drive pinion of the first electric machine to transfer torque from the first electric machine to the first idler shaft.

6. The drive unit of claim 5, wherein the second idler shaft and a second drive wheel is configured to mesh with a second drive pinion of the second electric machine to transfer torque from the second electric machine to the second idler shaft.

7. The drive unit of claim 6, wherein the first drive wheel is positioned adjacent to the second drive wheel such a portion of the first drive wheel overlaps the second drive wheel.

8. The drive unit of claim 6, wherein the axle centerline axis is positioned between the first and the second idler shafts.

9. The drive unit of claim 8, wherein the first idler shaft is spaced from the first electric machine such that the axle centerline axis is positioned between the first idler shaft and the first electric machine.

10. The drive unit of claim 9, wherein the second idler shaft is spaced from the second electric machine such that the axle centerline axis is positioned between the second idler shaft and the second electric machine.

11. The drive unit of claim 10, wherein the first idler shaft and the second idler shaft are spaced a same radial distance from the axle centerline axis.

12. The drive unit of claim 6, wherein the first output assembly includes a first output shaft coupled to the first axle shaft and orientated coaxially with the first axle shaft along the axle centerline axis.

13. The drive unit of claim 12, wherein the second output assembly includes a second output shaft coupled to the second axle shaft and orientated coaxially with the second axle shaft along the axle centerline axis.

14. The drive unit of claim 13, wherein the first output shaft is positioned along the axle centerline axis such that the first output shaft is positioned between the first electric machine and the second electric machine.

15. The drive unit of claim 14, wherein the second output shaft is positioned along the axle centerline axis such that the second output shaft is spaced a distance from the first and the second electric machines measured along the axle centerline axis.

16. The drive unit of claim 15, wherein each of the first and second output shafts includes a plurality of output gears fixedly coupled to the output shaft.

17. The drive unit of claim 16, wherein the first offset gear reduction assembly includes:
a first plurality of idler gears rotatably coupled to the first idler shaft, each idler gear of the first plurality of idler gears is configured to mesh with a corresponding output gear of the first
output shaft such that a rotation of an idler gear of the first idler shaft causes a rotation of the corresponding output gear of the first output shaft; and
a first shift mechanism coupled to the first idler shaft for selectively transferring torque from the first idler shaft to each of the first plurality of idler gears.

18. The drive unit of claim 17, wherein the second offset gear reduction assembly includes:
a second plurality of idler gears rotatably coupled to the second idler shaft, each idler gear of the second plurality of idler gears is configured to mesh with a corresponding output gear of the second output shaft such that a rotation of an idler gear of the second idler shaft causes a rotation of the corresponding output gear of the second output shaft; and
a second shift mechanism coupled to the second idler shaft for selectively transferring torque from the second idler shaft to each of the second plurality of idler gears.

19. The drive unit of claim 18, wherein the first gear assembly includes a 2-speed transmission including a first pair of output gears spaced along the first output shaft, and a corresponding first pair of idler gears spaced along the first idle shaft, each idler gear of the corresponding first pair of idler gears configured to mesh with a corresponding output gear of the first pair of output gears.

20. The drive unit of claim 18, wherein the second gear assembly includes a 2-speed transmission including a second pair of output gears spaced along the second output shaft, and a corresponding second pair of idler gears spaced along the second idle shaft, each idler gear of the corresponding second pair of idler gears configured to mesh with a corresponding output gear of the second pair of output gears.

21. The drive unit of claim 1, wherein the drive unit housing includes a plurality of walls including an inner surface defining a cavity, and wherein the first drive unit assembly and the second drive unit assembly are disposed entirely within the cavity of the drive unit housing.

22. The drive unit of claim 1, wherein the first drive unit assembly operated independently from the second drive unit assembly.

23. An axle assembly comprising:
a first wheel end assembly;
a second wheel end assembly; and
a drive unit coupled to the first wheel end assembly and the second wheel end assembly, the drive unit including:
a drive unit housing;
a first axle shaft orientated along an axle centerline axis and extending outwardly from the drive unit housing in a first direction defined along the axle centerline axis, the first axle shaft coupled to the first wheel end assembly such that the first wheel end assembly is spaced from the drive unit housing;
a second axle shaft orientated coaxially with the first axle shaft along the axle centerline axis and extending outwardly from the drive unit housing in a second direction opposite the first direction, the second axle shaft coupled to the second wheel end assembly such that the second wheel end assembly is spaced from the drive unit housing;
a first drive unit assembly positioned within the drive unit housing, the first drive unit assembly including a first electric machine and a first gear assembly for transferring torque from the first electric machine to the first axle shaft, the first gear assembly including a first output assembly coupled to the first axle shaft and a first offset gear reduction assembly coupled to the first output assembly and the first electric machine, wherein the first offset gear reduction assembly includes a first drive wheel and a first idler shaft that extends from the first drive wheel in the first direction; and
a second drive unit assembly positioned within the drive unit housing, the second drive unit assembly including a second electric machine and a second gear assembly for transferring torque from the second electric machine to the second axle shaft, the second gear assembly including a second output assembly coupled to the second axle shaft and a second offset gear reduction assembly coupled to the second output assembly and the second electric machine, wherein the second offset gear reduction assembly includes a second drive wheel and a second idler shaft that extends from the second drive wheel in the second direction;
wherein the first electric machine is spaced from the second electric machine such that the axle centerline axis is positioned between the first electric machine and the second electric machine; and
wherein the first offset gear reduction assembly is spaced from the second offset gear reduction assembly such that the axle centerline axis is positioned between the first offset gear reduction and the second offset gear reduction.

24. The axle assembly of claim 23, wherein the first electric machine and the second electric machine are orientated in a same direction.

25. The axle assembly of claim 23, wherein each of the first electric machine and the second electric machine includes a rotor shaft and an electric motor for rotating the rotor shaft, each rotor shaft orientated parallel to the axle centerline axis.

26. The axle assembly of claim 25, wherein each rotor shaft is spaced a same radial distance from the axle centerline axis.

27. The axle assembly of claim 23, wherein the first drive wheel is configured to mesh with a first drive pinion of the first electric machine to transfer torque from the first electric machine to the first idler shaft; and wherein the second drive wheel is configured to mesh with a second drive pinion of the second electric machine to transfer torque from the second electric machine to the second idler shaft.

28. The axle assembly of claim 27, wherein the first idler shaft extends from the first drive wheel in the first direction and the second idler shaft extends from the second drive wheel in the second direction.

29. The axle assembly of claim 28, wherein the axle centerline axis is positioned between the first and the second idler shafts.

30. The axle assembly of claim 29, wherein the first idler shaft is spaced from the first electric machine a such that the axle centerline axis is positioned between the first idler shaft and the first electric machine; and
   wherein the second idler shaft is spaced from the second electric machine such that the axle centerline axis is positioned between the second idler shaft and the second electric machine.

31. The axle assembly of claim 30, wherein the first idler shaft and the second idler shaft are spaced a same radial distance from the axle centerline axis.

32. The axle assembly of claim 27, wherein the first output assembly includes a first output shaft coupled to the first axle shaft and orientated coaxially with the first axle shaft along the axle centerline axis, and the second output assembly includes a second output shaft coupled to the second axle shaft and orientated coaxially with the second axle shaft along the axle centerline axis.

33. The axle assembly of claim 32, wherein the first output shaft is positioned along the axle centerline axis such that the first output shaft is positioned between the first electric machine and the second electric machine; and
   wherein the second output shaft is positioned along the axle centerline axis such that the second output shaft is spaced a distance from the first and the second electric machines measured along the axle centerline axis.

34. The axle assembly of claim 23, wherein the drive unit housing includes a plurality of walls including an inner surface defining a cavity, and wherein the first drive unit assembly and the second drive unit assembly are disposed entirely within the cavity of the drive unit housing.

* * * * *

UNITED STATES PATENT AND TRADEMARK OFFICE
CERTIFICATE OF CORRECTION

PATENT NO. : 11,192,448 B2
APPLICATION NO. : 16/639468
DATED : December 7, 2021
INVENTOR(S) : Shaun Mepham, Christopher G. Baillie and Vikram Chopra It is certified that error appears in the above-identified patent and that said Letters Patent is hereby corrected as shown below:

In the Claims

I. Column 12, Line 41 Please correct Claim 5 to read:
5. The drive unit of claim 1, wherein the first drive wheel is configured to mesh with a first drive pinion of the first electric machine to transfer torque from the first electric machine to the first idler shaft.

II. Column 12, Line 45 Please correct Claim 6 to read:
6. The drive unit of claim 5, wherein the second drive wheel is configured to mesh with a second drive pinion of the second electric machine to transfer torque from the second electric machine to the second idler shaft.

Signed and Sealed this
Second Day of April, 2024

Katherine Kelly Vidal
*Director of the United States Patent and Trademark Office*